(12) United States Patent
Hayden (10) Patent No.: US 11,227,335 B2
(45) Date of Patent: Jan. 18, 2022

(54) DIRECT-TO-CONSUMER FINANCIAL ANALYSIS AND ADVISOR COMPARISON SYSTEM

(71) Applicant: Robert M. Hayden, New York, NY (US)

(72) Inventor: Robert M. Hayden, New York, NY (US)

( * ) Notice: Subject to any disclaimer, the term of this patent is extended or adjusted under 35 U.S.C. 154(b) by 932 days.

(21) Appl. No.: 14/886,273

(22) Filed: Oct. 19, 2015

(65) Prior Publication Data

US 2016/0110813 A1 Apr. 21, 2016

Related U.S. Application Data

(60) Provisional application No. 62/065,687, filed on Oct. 19, 2014.

(51) Int. Cl.
*G06Q 40/06* (2012.01)

(52) U.S. Cl.
CPC ................... *G06Q 40/06* (2013.01)

(58) Field of Classification Search
CPC ........ G06Q 40/06; G06Q 40/00; G06Q 40/02; G06Q 50/186; G06F 17/246
See application file for complete search history.

(56) References Cited

U.S. PATENT DOCUMENTS

| | | | | |
|---|---|---|---|---|
| 5,727,161 A | * | 3/1998 | Purcell, Jr. | G06F 40/18 |
| | | | | 705/7.36 |
| 6,430,542 B1 | * | 8/2002 | Moran | G06Q 30/02 |
| | | | | 705/35 |
| 8,533,092 B1 | * | 9/2013 | Burrow | G06Q 40/02 |
| | | | | 705/36 R |
| 9,514,231 B2 | * | 12/2016 | Eden | G06F 16/9535 |
| 2003/0120574 A1 | * | 6/2003 | Wallman | G06Q 40/06 |
| | | | | 705/36 R |

(Continued)

OTHER PUBLICATIONS

Betterment: why-betterment. Mar. 30, 2016. <https://www.betterment.com/why-betterment/>.
EMoneyAdvisorProducts. Mar. 30, 2016. <http://www.emoneyadvisor.com/Products>.
Mint: How it works. Mar. 30, 2016. <https://www.mint.com/how-mint-works>.

(Continued)

*Primary Examiner* — Namrata Boveja
*Assistant Examiner* — Carol A See
(74) *Attorney, Agent, or Firm* — Panitch Schwarze Belisario & Nadel LLP (57) ABSTRACT

A direct-to-consumer financial analysis and advisor comparison system has a website in electronic communication with a server and is provided on a subscription basis. The website receives user information including estate, insurance, tax, and investment information. A system aggregator uses the user information to automatically calculate a financial wellness score for each user, representing a comprehensive financial analysis. The system aggregator uses the user information to automatically create a prioritized to-do list for each user, the to-do list representing tasks to be completed to track and implement a series of actions that will achieve the user's financial goals. A comparer uses the user information to automatically generate an aggregated viewpoint of all users, which is then reported back to each individual user to show a series of financial analytics regarding all users, a series of users based upon a sub-filter based upon specified criteria by the user, etc.

11 Claims, 8 Drawing Sheets

(56) References Cited

U.S. PATENT DOCUMENTS

| | | | | |
|---|---|---|---|---|
| 2004/0068490 | A1* | 4/2004 | Guibord | G06F 16/951 |
| 2006/0288267 | A1* | 12/2006 | DeSpain | G06F 40/18 |
| | | | | 715/212 |
| 2009/0192812 | A1* | 7/2009 | Hurowitz | G06Q 40/00 |
| | | | | 705/314 |
| 2011/0225079 | A1* | 9/2011 | Davidson | G06F 16/93 |
| | | | | 705/35 |
| 2013/0297532 | A1* | 11/2013 | Snyder | G06Q 40/06 |
| | | | | 705/36 R |
| 2013/0304573 | A1 | 11/2013 | Pinhas | |
| 2014/0372946 | A1* | 12/2014 | Duran | G06Q 10/0637 |
| | | | | 715/810 |
| 2015/0356643 | A1 | 12/2015 | Kohm et al. | |
| 2016/0267505 | A1 | 9/2016 | Murphy | |

OTHER PUBLICATIONS

Wealthfront: what-we-do. Mar. 30, 2016. <https://www.wealthfront.com/what-we-do>.

Koppenheffer, M., "So Many Hidden Numbers How Advisors Give Their Clients the Vampire Treatment," https://www.fool.com/investing/general/2012/05/11/so-many-hidden-numbers-how-advisors-give-their-cli.aspx, 9 pages (May 11, 2012).

NAPFA, "The National Association of Personal Financial Advisors," https://web.archive.org/web/20130306110914/http://www.napfa.org/about/FiduciaryOath.asp., 2 pages (Mar. 6, 2013).

TripAdvisorWatch, "How to Fake TripAdvisor Reviews," https://tripadvisorwatch.wordpress.com/2011/11/08/how-people-fake-tripadvisor-reviews, 8 pages (Nov. 8, 2011).

\* cited by examiner

FIG. 8B

DIRECT-TO-CONSUMER FINANCIAL ANALYSIS AND ADVISOR COMPARISON SYSTEM

CROSS-REFERENCE TO RELATED APPLICATIONS

This patent application claims the benefit, under 35 U.S.C. § 119(e), of U.S. Provisional Patent Application Ser. No. 62/065,687, filed on Oct. 19, 2014, the content of which is incorporated herein by reference in its entirety.

FIELD OF THE INVENTION

The present teachings relate generally to systems and methods for providing online personal financial reports, analytical tools, educational information and advice.

BACKGROUND OF THE INVENTION

Financial-related websites are known. For example, sites such as www.Mint.com, www.Betterment.com and www.Wealthfront.com capture a portion of an individual's total financial picture and provide some limited analysis. Sites such as www.eMoneyAdvisor.com offer additional analysis but are only made available to the consumer through an investment advisor and generally conditioned upon the consumer's continued use of that investment advisor. Due to lower cost, on-demand efficiency, ability to handle multi-variable complex mathematical analysis, greater comfort with online forums and a general distrust of conflict-ridden and unreliable advice of inadequately-trained human advisors, financial-related sites are growing in demand by consumers—either instead of or in addition to consumer's use of a human advisor.

Known financial-related websites have a number of deficiencies. What is needed is a web-based, direct-to-consumer system that provides comprehensive financial monitoring and independent analysis capturing not just a user's investments and/or transactions, but also insurance, tax, estate planning, retirement situation and other goals—without requiring the user's continued use of a particular human advisor. What is also needed is a system that provides users with comparative analytics against other users of the system, including analytics on other user's finances as well as reviews of other users' experiences with advisors. What is also needed is a comprehensive financial wellness score that enables the user to review, assess and weight their strengths, weaknesses, opportunities and threats across all financial data points, or within one individual financial data point, as well as the ability to create, track and maintain a prioritized action items list of recommended actions that will assist the user in assessing, implementing and achieving the user's financial goals. This alternative system and method would allow users to better organize, analyze and prioritize their entire financial situation, because such insights, analysis and recommendations provided in this alternative system (i) are not dependent on sales of financial products that users may have no interest in purchasing, (ii) are not dependent upon, or constrained to, information that would be viewed as acceptable to user's current or prior advisors, (iii) provides users with the ability to rate advisors, (iv) provides comprehensive analysis and recommendations—inclusive of areas that have traditionally been ignored such as estate planning, insurance, income taxes and divorce planning, and (v) provides comparative insights regarding other users' finances and other users' experiences with advisors.

SUMMARY OF THE INVENTION

The needs set forth herein as well as further and other needs and advantages are addressed by the present embodiments, which illustrate solutions and advantages described below.

The system of the present embodiment includes, but is not limited to, a direct-to-consumer comprehensive financial monitoring, analysis (including comparative analysis) and advisor review system. The system has a website in electronic communication with a server. An interface includes computer instructions executing on computer hardware and allows the plurality of users access to the system if they have paid for a subscription to the system. Once authorized, the website may request user information from the plurality of users, with such user information including data relevant to categories including, for example: (1) demographic information about the user—including, but not limited to, age, state of residence, citizenship status and marital status, (2) the value of assets owned by the user (and titling thereof, for example, if specified as "married" in question #1)—including checking and savings accounts (which the user will be given an option to either manually input or to link from an aggregation tool such as YODLEE®), investment accounts (which the user will also be given an option to either manually input or to link from an aggregation tool such as YODLEE® and includes brokerage accounts, managed accounts, retirement accounts and the cash value of life insurance), personal property (such as automobiles, artwork and items of significant value), real estate and net business interests, (3) the value of liabilities owed by the user (and titling thereof, if specified as "married" in question #1)—including credit cards, margin, loans against personal property, loans against real property such as mortgages, and student loans (all of which the user will be given the option to input either manually or to link through the aggregation tool such as YODLEE®), (4) demographic information about the users family—including, but not limited to, the name of the user's spouse (if specified as "married" in question #1) along with the spouse's age and an indication of whether the user is in the process of divorcing such spouse, the name(s) and age(s) of any children of the user along with an indication of whether the user intends to support such child for public or private school or college, and which assets set forth in question #2 and #3 are intended to be left to which of these individuals upon the death of the user (and upon the death of the user's spouse, if specified as "married" in question #1) with other options to leave to charity or "other individuals not listed," (5) insurance premiums—broken down by disability, medical/dental/vision, long-term care, life, homeowners, automobile and umbrella liability, (6) cash inflows and the duration thereof (e.g., categorized as salary, asset sale proceeds, retirement income, alimony, inheritance and government assistance), (7) cash outflows and the duration thereof—including, but not limited to, insurance premiums (which may be computed automatically based on a sum of premiums resulting from question #5), liability repayments (which may be computed automatically using the sum of the current liability balance, original balance, interest rate, term and structure inputs by the user), living expenses (which may be either manually specified in gross or in detail by the user or automatically generated from linked cash and credit card accounts and accepted by the user), property taxes (which may be requested if real estate was listed in question #2) and income taxes (which may be computed automatically based upon the extent of taxable cash inflows input in question #6, a federal tax table maintained on the system, a state tax table also maintained and tied to the specific state input by user in question #1 and is later automatically updated by deductible outflows listed in this question), (8) the values and types of accounts held for other family members, such as a 529 plan account for children or irrevocable trusts established, (9) assumptions regarding the age of retirement of the user and user's spouse and the asset class allocation of investment accounts and growth of such investments, and (10) whether the user has access to certain documents and, if so, whether the user wishes to upload such documents onto the user's site for later retrieval and reference by the user themselves (also, if properly authorized by user, other third party users such as user's advisors or user's family members) with such documentation to include insurance policies—with subfolders by type, tax returns—with subfolders by year, deeds and real estate documentation—with subfolders by property, estate planning and matrimonial documents—with subfolders by type of document (e.g., wills and revocable trusts, power of attorney, healthcare directives, matrimonial, irrevocable trusts) and bank and investment statements—with subfolders by institution. Once such data is input, the user can retrieve a series of output reports—such as a personal balance sheet (e.g., may be generated from inputs from questions #2 and #3), a long-term cash flow projection (e.g., may be generated from questions #6, #7 and #9), an investment report (e.g., may be generated from questions #6 and #9), an insurance summary report (e.g., may be generated from question #5) and an estate flowchart (e.g., may be generated from question #2, #3 and #4). More detailed reports—such as those reviewing only the liabilities on the balance sheet—can also be produced, along with hypothetical, on-demand analysis by the user as to how the impact of certain variables would impact the user's situation long-term—such as the amount of interest or taxes the user would pay overall given a certain course of action. Meanwhile, once the user's data is fully input into the system (i.e., all 10 questions above are answered), the system aggregator may then provide computer instructions executing on computer hardware to retrieve anonymous financial data points from particular fields from each individual user of the plurality of users. The system aggregator then stores such data and serves as the database from which each individual user can make queries in order to retrieve comparative analytics based upon user-specified criteria (e.g., provided that a sampling of at least 100 users exists that match such criteria in order to maintain anonymity of each user and remove outliers). The comparisons may include relevant data points of all users, such as the median living expenses of users within a particular income range, median fees paid to certain advisors and the broad asset allocation of all users on the system—for example, by percentage of equities, tax-exempt fixed income, taxable fixed income, cash and alternative investments. The results of the comparative analytics queries are then combined with a user-specific comprehensive financial analysis of the user's underlying data points (e.g., applying well-accepted financial planning principles such as ratio analysis evaluating debts to assets on the user's balance sheet, ratios evaluating liability repayments to income on the user's long-term cash flows, internal analysis evaluating after-tax debt rates to after-tax expected asset growth rates on the user's balance sheet and an overall evaluation as to the extent to which the user has a positive or negative ending balance on the user's long-term cash flow projection in the year of death), which may serve as the basis for the comprehensive financial plan recommendations. The recommendations automatically create a prioritized to-do list for each of the plurality of users, the to-do list representing either a listing of automatically generated tasks based on the results of the analysis (if elected to be incorporated by the user) or else more simply a listing of manual tasks desired to be important to the user in achieving user's financial goals. Due dates and reminders are then triggered by the system automatically by the user on the date set forth by the user, which sends the user an email reminder as to when certain items are coming due and the user's overall progress towards completion of various tasks.

Other embodiments of the system and method are described in detail below and are also part of the present teachings.

For a better understanding of the present embodiments, together with other and further aspects thereof, reference is made to the accompanying drawings and detailed description, and its scope will be pointed out in the appended claims.

DETAILED DESCRIPTION OF THE INVENTION

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments.

In compliance with the statute, the present teachings have been described in language more or less specific as to structural and methodical features. It is to be understood, however, that the present teachings are not limited to the specific features shown and described, since the systems herein disclosed comprise preferred forms of putting the present teachings into effect.

For purposes of explanation and not limitation, specific details are set forth such as particular architectures, interfaces, techniques, etc, in order to provide a thorough understanding. In other instances, detailed descriptions of well-known devices, circuits, and methods are omitted so as not to obscure the description with unnecessary detail.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The use of "first", "second" etc. for different features/components of the present disclosure are only intended to distinguish the features/components from other similar features/components and not to impart any order or hierarchy to the features/components.

It is desirable to have comprehensive financial planning tools made available over the Internet to the broader public who may not be able to afford a quality, conflict-free human advisor. Consumers want on-demand comprehensive financial decision analysis, which existing tools that have limited viewpoints to investments or transactions are unable to provide. It is also desirable to have a system that provides insights as to what decisions and results other users with a similar profile have been making (e.g., such as what percentage of their income they were giving to charity, what fees they were paying to their advisors, how their investments were allocated, what performance they were receiving, etc.).

The present teachings are directed to cost-effective, comprehensive and on-demand personal financial management tools that may be used by self-directed individuals or partially-advised individuals. Such individuals may fall into one of the following groups: (i) emerging affluent individuals—such as many millennials—who cannot afford to continuously work with a human advisor; (ii) high net worth individuals who can afford to work with a human advisor but do not trust that a human advisor can offer competent and unbiased value at a reasonable price; and (iii) individuals at all wealth and income levels who work with a human advisor but seek additional information or tools, such as comparative information about their financial situation, comparative information about their current or prospective advisors or a single-source tool that will help to organize their entire financial situation.

One common thread among individuals in need of a comprehensive online financial analytics tool of the nature described herein are individuals who are comfortable using web-based tools, individuals who are cost-conscious (e.g., in general or as pertaining to advisor fees), individuals who desire to compare their situation with the situation of others to help inform their decision-making, individuals who are busy and desire a single-source system to consolidate their financial affairs, individuals who do not currently work with human advisors and individuals who are facing important life decisions and require independent, on-demand financial analytics to assist with understanding the financial impact of decisions made. These individuals are now represent a growing segment of the U.S. and global population. Such a system according to the present teachings can provide uniquely valuable insights on a private, low-cost and progressive-depth basis, either as a standalone self-management tool or as a tool used in conjunction with periodic advisor services.

The existing personal financial management tools are limited in a number of ways—described below as what will be referred to herein as "Limited View," "Limited Glue," "Limited Clue" and "Limited to You" problems.

"Limited View" sites such as www.Mint.com, www.Betterment.com and www.Wealthfront.com only capture a limited portion of an individual's total financial picture, generally limiting their viewpoint to investments-only or cash flows-only. These tools generally do not include comprehensive analysis as to other important areas of an individual's financial life—such as insurance, taxes, estate planning or planning around the financial impact of various life events such as marriage, divorce, college planning, business succession, child birth, real estate transactions, retirement, etc. These areas and events all impact financial goals in significant ways that are not being fully captured by these systems. For these reasons, such "Limited View" sites can quickly become inadequate for the self-directed individual.

In contrast, the present teachings appreciate that any changes that an individual makes to one area of his or her financial life could potentially trigger consequences to another area. As such, the present teachings provide a comprehensive viewpoint, including not only analysis on insurance, taxes and estate planning but also insights regarding current and potential advisors, although not limited thereto.

"Limited Glue" sites such as www.eMoneyAdvisor.com seek to address the "Limited View" problem by offering comprehensive analysis on multiple aspects of an individual's financial life. However, these sites are made available to the consumer only through an existing advisor—and are therefore limited in the use, disclosures and buy-in of the individual consumer upon whose data the system relies for relevance. Stated differently, the consumer is required under such sites to continue using that advisor granting access (or to find another advisor using the same software) in order to maintain access, which becomes problematic in situations where that advisor is not otherwise continuing to deliver value. As a result, not only does the consumer/user lack control over the manipulations of his or her data in the system, but for a number of reasons (e.g., conflict-of-interest) these systems are unable to provide certain helpful insights to the User—such as an objective evaluation of the advisor or the performance of assets managed by that advisor relative to the performance of assets managed by advisors of other users on the system. For these reasons, the level of retention and tie-in—or the "Glue"—between the user and these systems is inherently limited.

In contrast, the present teachings may be offered direct-to-consumer so that users will be encouraged to connect and to re-connect with the system regardless of which advisor they use. This also provides a valuable benefit that information on various advisors can be shared on the system so that users can compare useful data points such as the advisor performance and fees.

"Limited Clue" sites such as www.PersonalCapital.com are available directly to the consumer, but are limited in that they primarily allow financial data to be organized and/or aggregated—primarily for the purpose of obtaining additional assets under management. While these features might be helpful to the consumer, what is needed are legitimately objective recommendations and insights as to what advice and action(s)—or "Clues"—the consumer should take based on the consumer's information, as well as some type of scoring mechanisms and visual data representations for users to quickly understand the assessment.

A system according to the present teachings may provide the consumer with such "clues" by automatically generating a comprehensive financial plan narrative based on the user's individual inputs and comparative inputs with others. This not only provides the recommendations the user has been seeking but also provides an incentive for the user to complete all input areas until completion (since the more information the user provides, the better and more comprehensive the output analysis). In addition, the user can quickly toggle between hypothetical data entry input and visual data representation, to see the immediate impact of one change in variable, without changing the permanent "global" inputs. Finally, the system has special subscription add-on browsing capabilities for certain aspects, such as third party reviews of certain advisors (which are more detailed than the simple star-based system that is based upon independence/ethics, performance and expertise/education/ experience) and private investment reviews (e.g., may be based upon a scoring system providing a score weighted at, for example, 30% on management, 20% on barriers to entry, 10% proof on concept, 10% economic environment, 10% suitability in portfolio, 10% tax and legal structure of the investment and 10% based on fair valuation). Combined, these advice-giving features will assist the user in receiving a "Clue" as to what actions to take next.

Finally, "Limited to You" sites such as www.LearnVest.com are limited in an important way: these sites only provide information about the consumer, not others. While receiving such information is one reason why the consumer subscribes to the site, what is needed is to show the user how his or her situation compares with other users in their local area, income bracket, or net worth level, although not limited thereto.

A system according to the present teachings may provide comparative analysis to address this need. Such insights respond to a very human emotion that most of us learn early in life: how we measure up against others and whether our situation is "normal" or "abnormal". Providing comparative information offers a moving benchmark and a reason for users to connect and to re-connect to the system.

Since other personal financial management companies rely heavily on contractual relationships with advisors, incorporating comparative insights about advisors' fees and performance provides both a uniquely valuable service to users and a clear competitive advantage that existing companies are prevented by conflict from providing. The collection of this information has not been available in the prior art. Accordingly, its analysis is a new technical solution made available by this technology.

A system according to the present teachings may provide an overall "financial wellness score" to the user after receiving information from the user. The financial wellness score may be represented as a single number, although not limited thereto. Such information may include estate, insurance, tax, and investment information received after giving questions to the user, although not limited thereto. Whereas prior art systems do not provide insight into comprehensive financial wellness, the present system can weigh different financial aspects to generate an overall financial wellness score. The system may also generate automated to-do list to improve a user's financial wellness score.

The system is also more comprehensive because it may capture all aspects of the user's financial life—including, but not limited to, cash inflows (including salary/bonus, asset sale proceeds, retirement income, alimony, inheritance and government assistance), cash outflows (including living expenses, insurance premiums, liability repayments and income taxes paid), portfolio growth, assets and liabilities. These data points lead to a number of output reports—such as a balance sheet and long-term cash flow projections which can then be used to provide comparative analytics against other user's reports as well as advisors reviews in order to deliver comprehensive financial analysis and plan recommendations to the user. Such comprehensive and comparative analysis is not available in prior art systems, particularly one that is direct-to-consumer. Since the consumers are providing the information, the system is independent of advisor bias, and allows for neutral evaluation and comparison of advisors.

The system may compare any number of different aspects of users' financial information. For example, the system may compare investment performance, asset allocation, advisor fees, insurance coverage, and spending habits, although not limited thereto. Comparison on the advisor level may be head-to-head—i.e., one advisor against another advisor while comparisons on the user level may be made against a group. These comparisons may also be based on specific demographics. For example, a user may want to see investment performance of others in the user's age range, income bracket, geographic area, etc.

With a system according to the present teachings, financial planners and consumers may quickly view their financial information while also being able to quickly run hypothetical output reports based on certain scenario variables for on-demand decision analysis. Users may be able to both enter hypothetical data directly into a report-specific field to view results within that report for hypothetical, ad hoc temporary decision analysis, or input "global" fields that will populate all fields of the report on a permanent basis. This is uniquely valuable in that prior art systems do not allow a user to input data both on a particular report and in global permanent fields. As an on-demand solution, it allows the manipulation of data for "what if" analysis while not disturbing the global permanent inputs.

Populating global input fields leads to a system-generated comprehensive financial plan and financial wellness score. This does not exist in the prior art—and certainly not a system that provides a comprehensive user-weighted score. Since one size never fits all in financial planning, the present teachings allow the user to enter in their own importance to each factor on a general objectives questionnaire, and then translates those responses behind the scenes to a score, which is then multiplied by various weights provided under a SWOT (Strengths, Weaknesses, Opportunities and Threats) analysis.

Another unique feature is the comparative analytics and advisor reviews. The personal advice business has suffered from scandals and lack of transparency, so the present teachings attempt to "shine the light" by allowing the user to rate their qualitative experience with a particular advisor based on a number of core factors (e.g., responsiveness, communication style, expertise, skills, independence, etc.) and to provide quantitative metrics and more detailed information about that advisor—including the fees the user paid and how the user was referred to that advisor.

The system may also include comparative analytics tools that pull in data into particular fields from separate information stores provided by independent advisors. Since it is desirable to deliver consolidated reporting, independent advisors may have such insights, including about the performance of outside investment managers, the fees they are paying, and spending data. This is also helpful to feed into the system, aggregate and then report out anonymously (e.g., may be on a median basis to dispense with the outliers, etc.).

Figure 1:
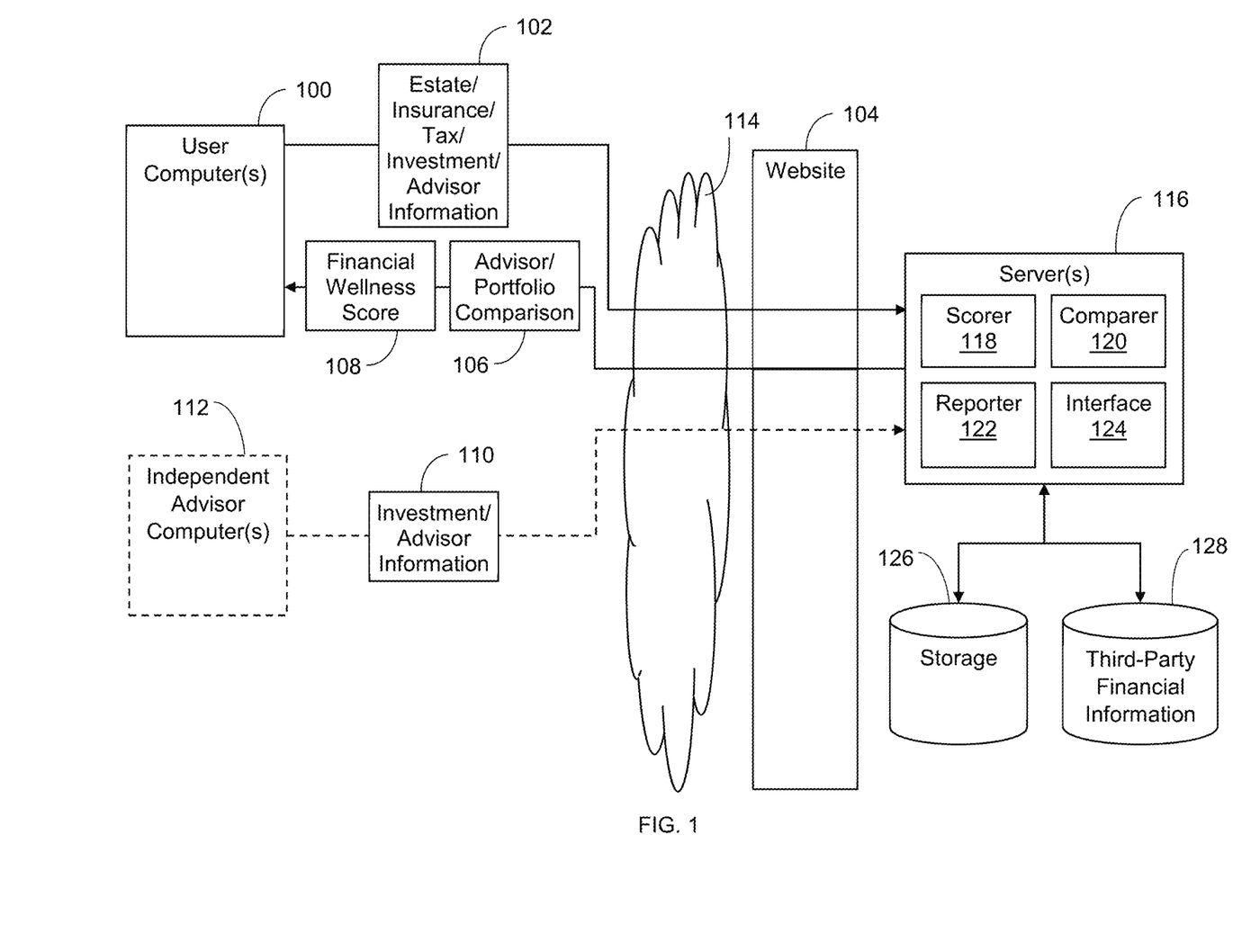
FIG. 1 is a schematic diagram of on embodiment of the system according to the present teachings

Referring now to FIG. 1, shown is a schematic diagram of one embodiment of the system according to the present teachings. The system may comprise a website 104 that allows one or more user computers 100 to interact with one or more servers 116. Using the website 104, users may provide information 102 to the server(s) 116 over the Internet 114 and receive a financial wellness score 108 and comparison information 106, although not limited thereto. Information 102 may be stored in one or more storages 126.

The server(s) 116 may include a system aggregator and scorer 118. Using the information 102 provided by a user, the system may calculate and return to the user comparative data as to users matching a specified criteria set as well as a financial wellness score 108. The financial wellness score 108 may take into account a variety of information that affects a user's financial wellness. For example, this may include estate information, insurance information, tax information, investment information, as well as advisor information, although not limited thereto. Whereas prior art systems focus on investment information, the present teachings can provide comprehensive financial analysis using this information. Information may be supplied by the user to complete a user profile and in response to questions asked by the system (see, e.g., FIG. 7).

In one embodiment, the comprehensive financial score may be based upon a score from 0 to 16, with 16 being the highest. The system (e.g., system aggregator and scorer 118) may review 16 areas of the user's situation—including: (1) the amount of the users overall cash position relative the user's 6-month living needs, (2) the extent to which the user's deposit accounts are fully FDIC covered, (3) the interest rate the user specified was being received on cash versus current interest rates generally being paid on cash, as published by third party sources, (4) the extent to which certain tax deductions are being fully utilized, based upon the amount of deductions in particular categories claimed by all other users on the system within the user's income and net worth range, (5) the extent to which property taxes should be considered for appeal, based upon property taxes paid by other users on the system with homes of a similar value and the value of going through the appeal process relative to what may be recovered, (6) the extent to which long-term cash flow projections are adequate through life expectancy without any changes to living expenses, (7) the extent to which large charitable giving (e.g., may be defined as giving above $1,000) is being done with appreciated stock or with cash, (8) whether the user has college fully funded, if the user indicated that it was important for him or her to do so, (9) whether the user's current allocation of investments leads to a level of risk and return that is in line with the user's stated risks and returns, (10) the extent to which the user's allocation towards taxable fixed income is held in any tax-deferred vehicles available to the user—such as 401k or IRA vehicles, (11) whether the fees paid to managers exceeds the return generated by such managers over applicable benchmarks (e.g., maintained on the system), (12) whether the user's debt level is under 50% of assets and, if so, whether the after-tax rate being paid on debt exceeds returns user indicated that he or she expects on his or her investments, (13) whether the user's current overall liability insurance—inclusive of umbrella liability, homeowners and auto insurance—combined with amounts held in protected IRA, 401K and business interests, results in any remaining liability exposures on the balance sheet, (14) whether property listed on the balance sheet is covered by coverage listed on insurance, (15) whether life, health and disability coverage does not result in necessary living expenses changes in the event of death, severe illness or disability, and (16) whether the user's current estate plan results in less than 10% in estate taxes with at least 60% of assets passing in nonprobate form. Each of these 16 factors may be reviewed by the system and answered in the form of a "yes," "no" or "somewhat" format—translating to a score of a "1" for "yes," "−1" for "no" and "−0.1" for "somewhat," Before the score is generated, the user may be requested to weight the importance of each of these factors on a scale of 1-3, with "1" being "not important" and "3" being "highly important." The scores may then be multiplied by the user's specified weight, and the results thereof in each of the 16 categories aggregated to produce the overall financial wellness score.

The server(s) 116 may include a comparer 120. Unlike prior art systems, a system according to the present teachings provides the ability for a user to compare aspects of his or her financial profile with others. This is in part a result of the direct-to-consumer model. In the prior art, financial analysis systems (e.g., www.eMoneyAdvisor.com) are provided through investment advisors. As a result, such systems are beholden to the investment advisors and they are unable to provide tools that allow users to analyze/compare investment advisors. Using the system according to the present teachings, it may be possible to compare the fees charged by advisors and the performance of investment advisors. Prior art systems have not provided such comparisons.

Because the present system is a comprehensive system, it is also possible to compare other attributes. For example, information such as insurance coverage and spending habits can be compared to other users. As shown in FIG. 1, users may provide any type of financial-related information 102 and the comparer 120 may provide comparative analytics 106 to the user.

Comparisons may include filtering and/or sorting on different demographics. This way, a user can compare his or her situation relative to similar users. As will be appreciated by one skilled in the art, demographics can include any number of factors, such as gender, race (e.g., ethnicity), age, household income, home ownership (e.g., length of residence, home size, mortgage), education, employment status, number of children, geographic location, marital status (e.g., head of household, spouse), and savings (e.g., investments), although not limited thereto.

In one embodiment, information 110 may be provided by one or more independent advisors 112. Independent advisors 112 may have a wealth of information regarding investment advisors and users. Independent advisors typically manage assets for clients that use multiple investment advisors. As a result, independent advisors can provide the system with historical data for investment advisors as well as demographics of investors. Independent advisors 112 may upload investment/advisor information 110 to the system using the interface 124, although not limited thereto.

The server(s) 116 may include an interface 124. The interface 124 may allow the user interact with the system and may include a website 104. The interface 124 may also include an application for a mobile device, although not limited thereto. The interface 124 may also provide for interaction with third-party 128 providers of financial information. For example, information provided by third-parties 128 may include market information, demographics information, etc.

The server(s) 116 may include a reporter 122. The reporter 122 may provide reporting features placed behind a pay wall and provided on a subscription basis, although not limited thereto. As discussed further below with reference to FIGS. 2-8, reporter may include a spreadsheet-based interface that allows both reporting as well as the collection of information from the user.

In one embodiment, the system may be used by an investment advisor (e.g., independent advisor, etc.) as a tool to assist a user in improving his or her financial wellness. The advisor may have a separate log-in that provides the ability to manage the advisor's clients and provide private communication with them through the website. The system may keep the advisor updated about the status of the user's financial wellness, so that the advisor can help direct/advise the user as needed.

Referring now to FIGS. 2-8, shown are exemplary screenshots according to the system of FIG. 1. One skilled in the art would appreciate the different ways a system according to the present teachings could be implemented, as shown in the Figures of U.S. Provisional Patent Application Ser. No.

62/065,687, filed on Oct. 19, 2014, the content of which is incorporated herein by reference in its entirety.

In one embodiment, reporting may be in the form of a spreadsheet interface. Analytics may include formulae defined in spreadsheets that are populated with data provided by the user. In this way, the user may modify information (e.g., what-if scenarios) and immediately see the effects of the changes, which may be recalculated by the spreadsheet interface without refreshing the page. This may provide flexible, on-demand responses based on manual inputs and data imports, using a series of hyperlinks, macro buttons, charts and formulas (e.g., algorithms), although not limited thereto.

Reporting may be automated and start with one input tab (e.g., sheet) on the system (e.g., may be spreadsheet-based), which can accept automated inputs from account aggregators such as YODLEE®, FISERVE®, BYALLACCOUNTS® or INTUIT®, although not limited thereto. Once imported into the system by the user inputting his or her credentials to the user's certain bank account(s), credit card account(s) or investment account(s) to link into the system, the user may then activate automated inputs into the system to sort the data into the appropriate fields within the report. Specifically, imported values of checking, savings, brokerage, retirement and other investment account values may feed to the respective areas of the balance sheet and may further feed to the applicable "beginning balance" area of the long-term cash flow projection (e.g., as the starting source of cash for the starting year after considering any remaining inflows, outflows and portfolio growth/loss expected for the remainder of the starting year). Similarly, imported transactions that relate to checking or credit card accounts may be feed to short-term spending reports, which the user may further be able to override any automatic system categorization, either on a one-time basis or on an ongoing automated rule basis.

The user may also have the ability to enter data manually, which can also be pushed out to all applicable output reports. The inputs that the user may manually input include his or her age (e.g., may hold relevance to the point at which long-term cash flow projections stop—generally age 100), names and ages of family members (e.g., may tie to support and hypothetical analysis reports such as estate planning and college planning), inflows and outflows (e.g., may tie to the long-term cash flow projections report), assets and liabilities (e.g., may tie to the balance sheet report) and basic information about insurance, estate plans, investments and savings for other family members. Until the user refreshes the entire report, this manual information may stay within the system, allowing the user to have the ability to manipulate data in any of the reports without fear that he or she is disturbing the base underlying information. From there, the user may be able to see static reports (e.g., balance sheet, etc.) or dynamic decision analysis reports (e.g., long-term cash flow report, etc.) using various tools (e.g., sliders) for changing various values and growth rates.

Such reporting capabilities are unique in the way that they allow the analysis of information and push it out to a master spreadsheet, which may be useful from a comparative analytics standpoint. In one embodiment, fields may be color-coded: tan variants for headings, blue variants for selections/options, and white for user input field. Each report may have a hyperlink button that allows the user to return to the main reports selection page, and also may have a hyperlink that allows the user to return to detailed input fields. This is helpful in that some users want to see those details and others may not.

The financial plan analysis is unique as it ties in various aspects of the user's financial situation from various previous reports (e.g., tabs, sheets). For example, it may look at the cash position as stated on the balance sheet and relate it to one-half of the expenses from the long-term cash flow report in order to answer "does this client have at least 6 months of an emergency fund?" The comprehensive nature of this system (e.g., includes information for a user beyond investments) provides for a robust financial analysis not available in the prior art.

Figure 2:
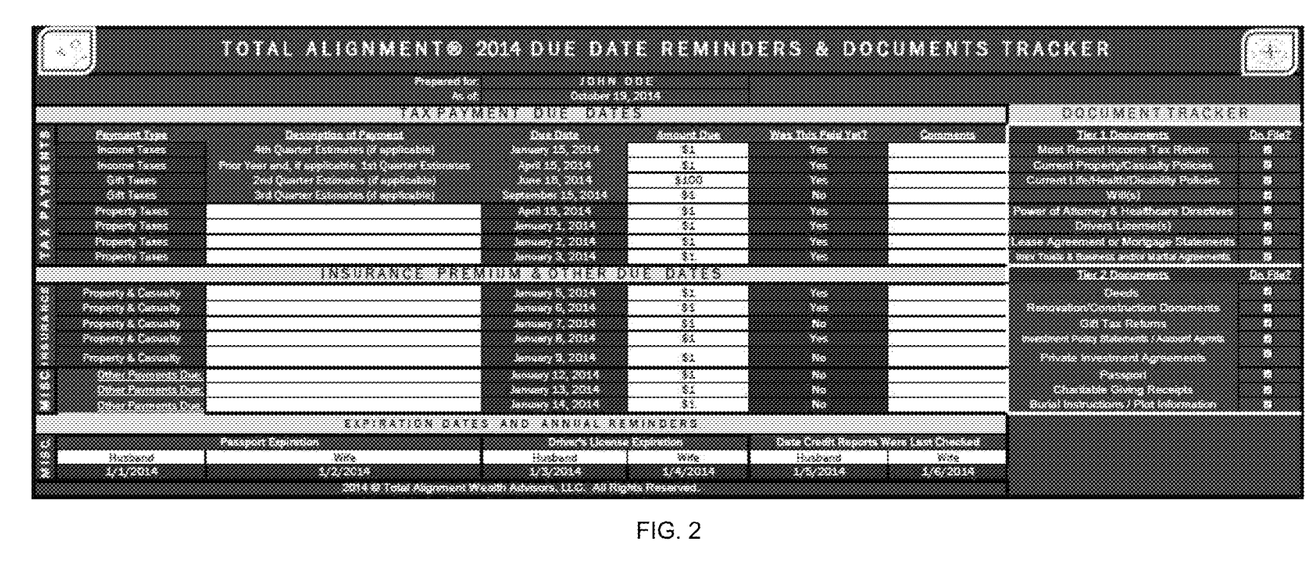
FIGS. 2-4, 5A-5B, 6A-6B, 7, and 8A-8B are exemplary screenshots according to the system of FIG. 1.

Referring now to FIG. 2, shown is a screenshot of due date reminders and document tracking according to the present teachings. Using the comprehensive system, users can track any number of deadlines (e.g., tax payments, insurance premiums, passport/license expiration, credit report checking, etc.). Users can also track documents and statuses (e.g., tax returns, insurance policies, wills/estate documents, mortgage statements, deeds, receipts, etc.). When documents are uploaded to the system, they may be automatically identified and data extracted and inputted into the system. This may save the user from manual data entry.

Figure 3A:
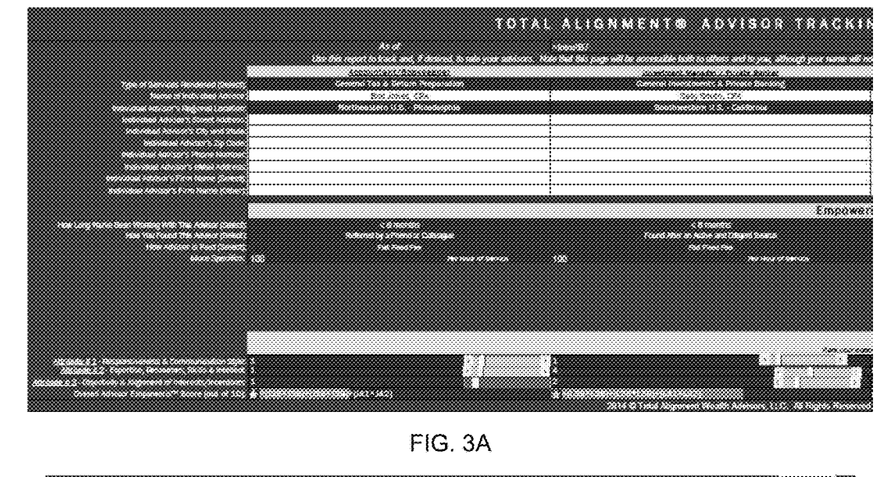
Figure 3B:
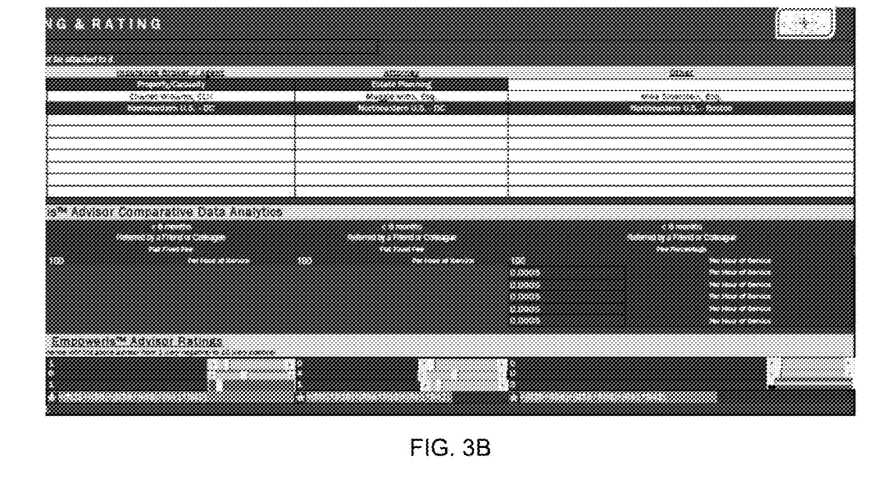

Referring now to FIGS. 3A and 3B, shown is a screenshot of advisor ratings and comparison according to the present teachings. The system may allow the user to track all of his or her providers (e.g., accountant, insurance agent, attorney, etc.). The system may allow the user to track information about services provided, contact information, how the relationship began (e.g., referral), fees charged, etc. The user can also rate the provider based on a number of different factors, including responsiveness, communication style, expertise, objectivity, etc. As will be appreciated by one skilled in the art, prior art systems do not allow such ratings of advisors.

Figure 4:
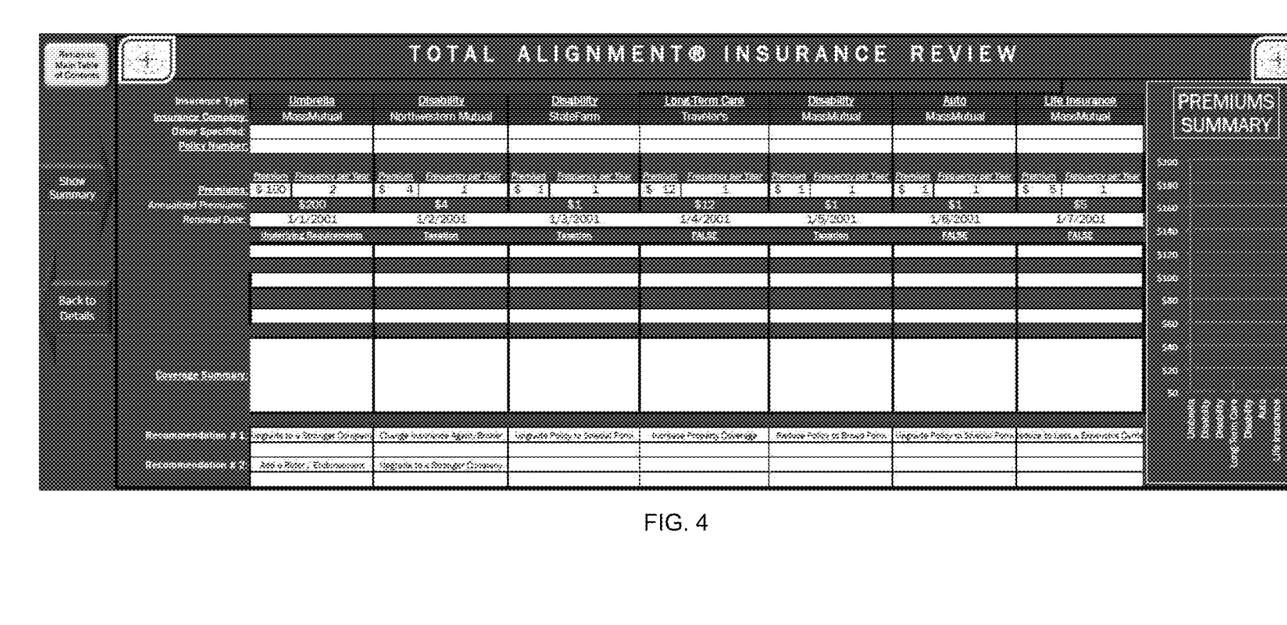

Referring now to FIG. 4, shown is a screenshot of insurance review according to the present teachings. Again, the comprehensive nature of the system allows a user to track multiple financial-related areas of a user's life, including insurance, estate, tax, and investment, although not limited thereto. As shown, a user can track various insurance policies, including due dates and fees, and the system may provide recommendations based on the user's comprehensive financial status (e.g., increase property coverage based on home value, etc.).

Figure 5A:
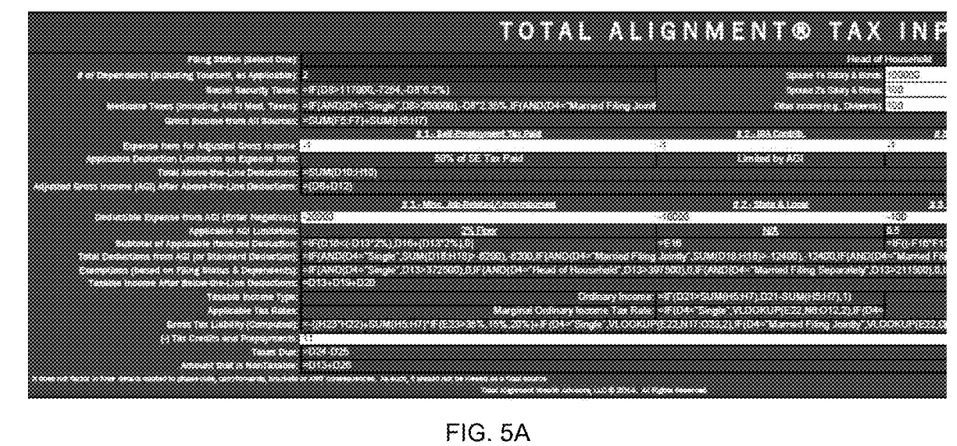
Figure 5B:
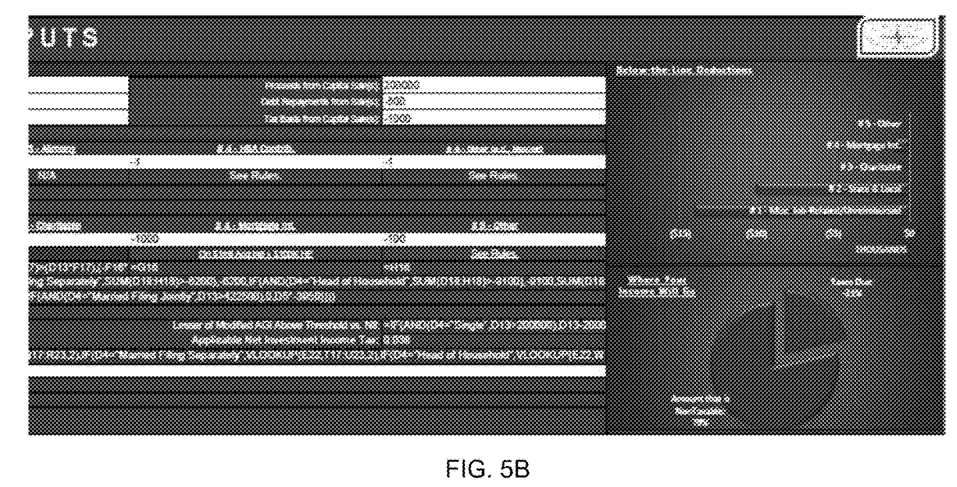

Referring now to FIGS. 5A and 5B, shown is a screenshot of tax inputs according to the present teachings. Again, this screenshot shows the comprehensive nature of the system, allowing detailed tax information collection and reporting. This information interacts with and affects other aspects of the user's financial profile.

Figure 6A:
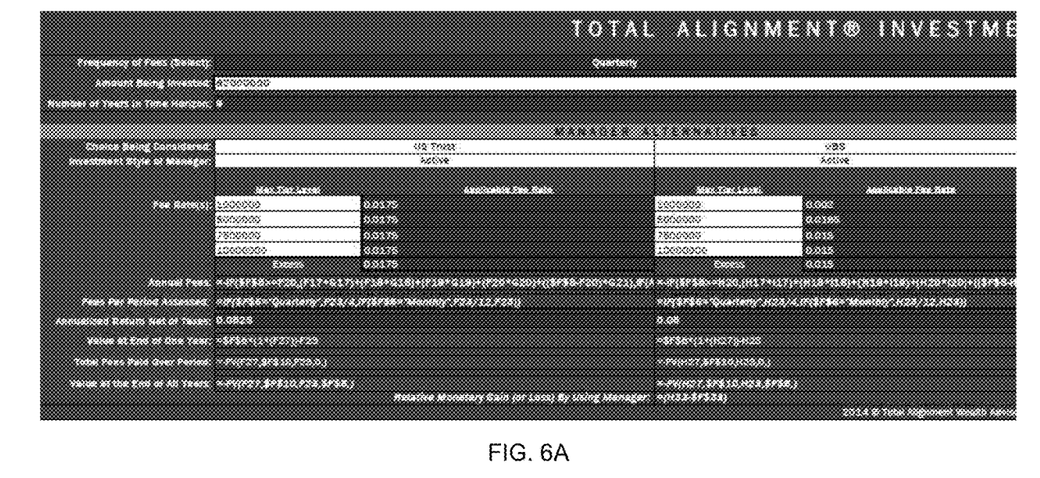
Figure 6B:
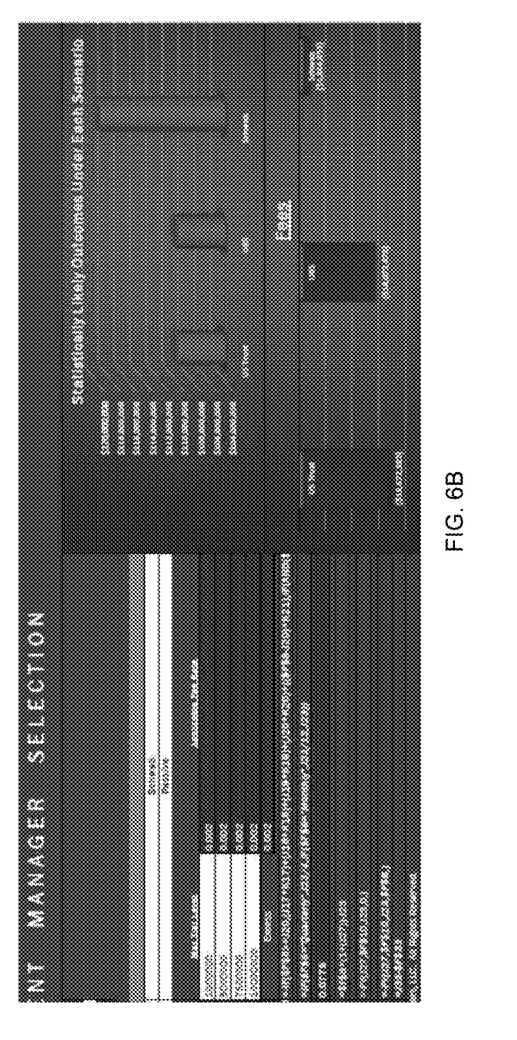

Referring now to FIGS. 6A and 6B, shown is a screenshot of investment advisor (e.g., manager) comparison according to the present teachings. Because the system has detailed investment performance and fee information for investment advisors (e.g., provided by users), it is possible for the users to compare likely outcomes using different investment advisors. Such comparisons have not been available in the prior art.

Figure 7:
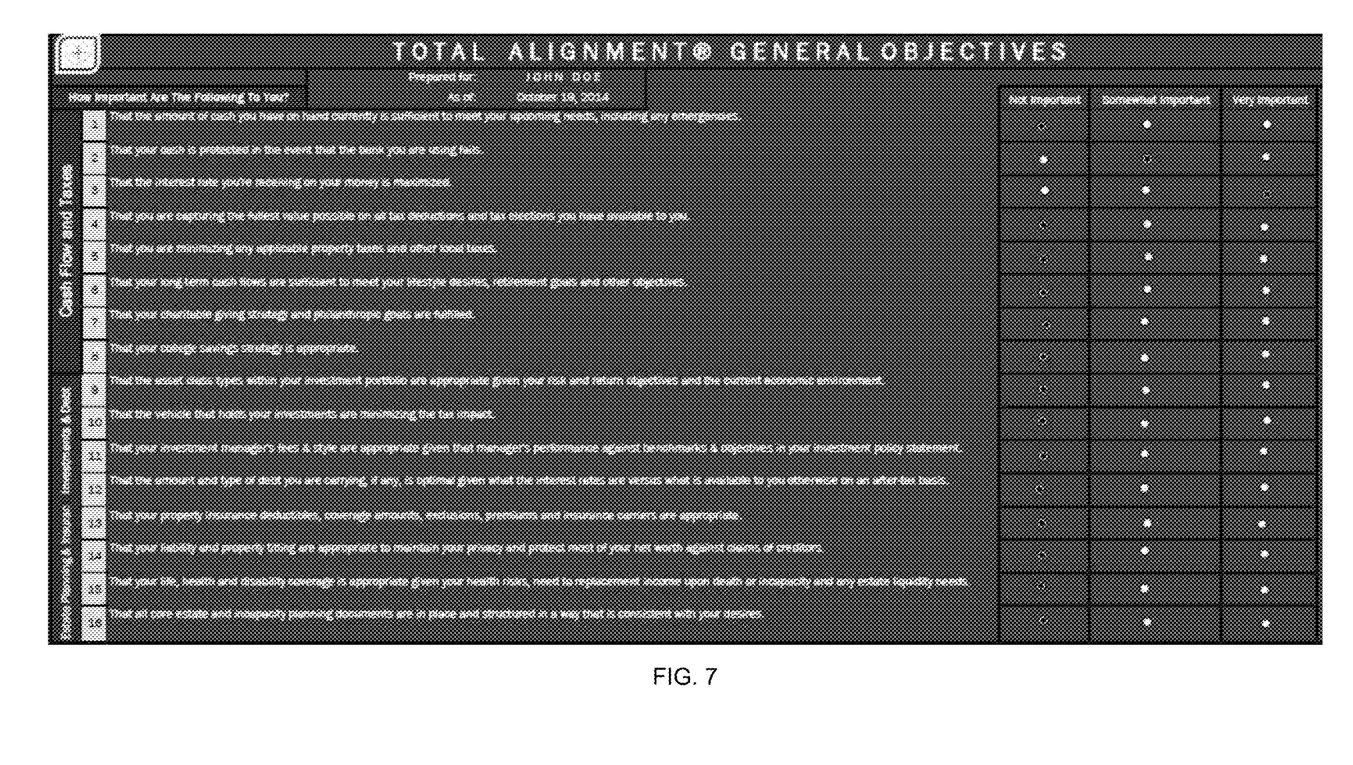

Referring now to FIG. 7, shown is a screenshot of general objectives according to the present teachings. Because the system is direct-to-consumer, it has the ability to ask users specific financial-related questions. In one embodiment, questions may be asked to complete a user profile helpful to perform financial analysis on the user. As shown, users may initially be asked questions the answers to which can be used to provide a financial wellness aggregate score. These objectives of the user can be used to weight different areas of the user's financial profile for creation of the financial wellness score/financial analysis. In one embodiment, color-coding may be used to quickly identify which of the questions were viewed as problem areas by the system (e.g., in red) and which were viewed as favorable or benign (e.g., in green).

Figure 8A:
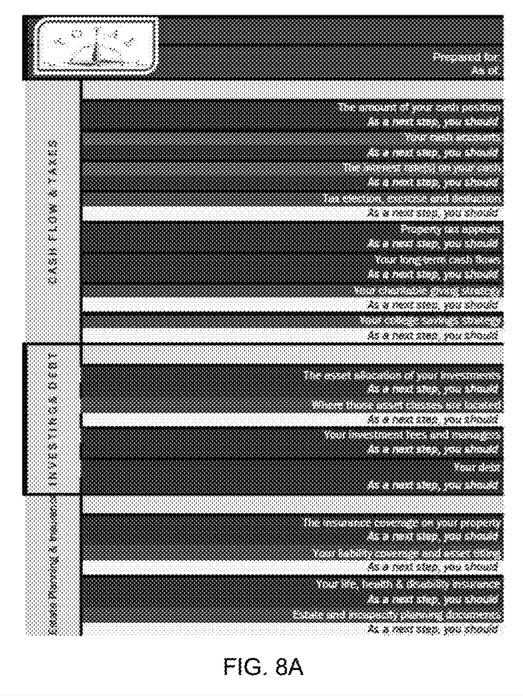
Figure 8B:
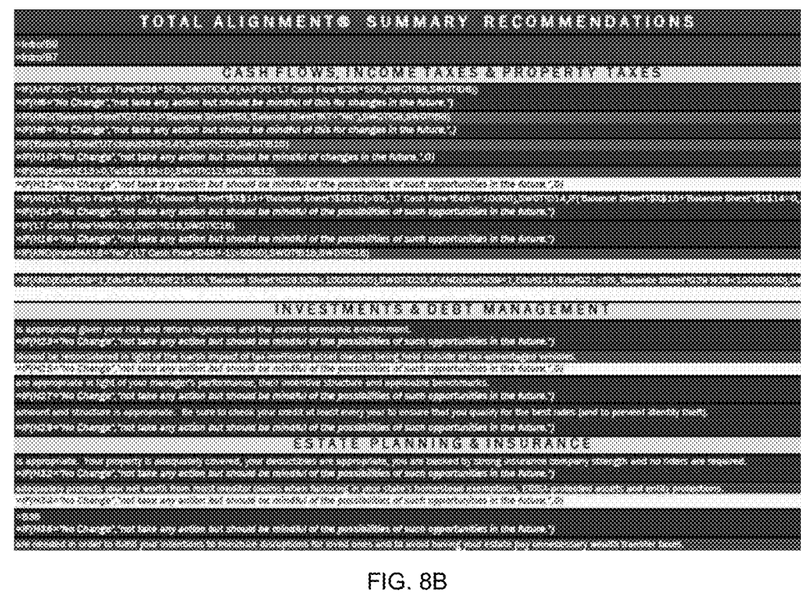

Referring now to FIGS. 8A and 8B, shown is a screenshot of a to-do list according to the present teachings. Based on a user's financial position, whether obtained from financial documents, questions, etc., the system may provide recommendations to the user on how to improve financial wellness. As shown, the system may generate a prioritized to-do list of tasks to be completed to improve overall financial wellness. These tasks may be docketed for follow-up with reminders to help assure the user remains on pace to improve his or her financial wellness.

The comprehensive analysis resulting from the, for example, 16-factor score, may be the same upon which the narrative financial plan (e.g., also prioritized to-do list) is based. For example, in the category of the amount of cash position, the system may compare the amount set forth in checking and savings accounts with 50% of the amount set forth as living expenses. If the amount is lower than 50% of living expenses, the system may produce a recommendation to increase cash to a specified amount tying to 50% of living expenses—which the user can then import into his or her to-do list along with a user-specified due date. Similarly, if the user holds an account worth an amount above FDIC limits (currently $250,000) in his or her name at a single institution, the system may generate a recommendation to reduce the amount held in this account by the differential. In the situation where the ending balance in the last year of life expectancy is negative in the long-term cash flows—which is the scenario that many users fear and which is the most likely use of the system, the system may generate a recommendation to the user to plan on one or more of the following actions: (1) to sell a specified amount of personal property, real estate or business interest assets in the specified year in which the user's ending balance turns negative—in order to bring new sources of cash into the long-term cash flow model, (2) to reduce living expenses or other outflows by a specified amount that results in the ending year balance remaining positive, (3) to increase inflows—either through attaining higher-earning employment or from assistance from family or the government, or (4) to maintain inflows for a longer period—as in the delay of retirement. The user will be able to select from these choices for inclusion on their to-do list, even if it involves a due date far into the future.

The comparative analytics according to the present teachings is uniquely valuable to both consumers and to independent advisors in that it provides unprecedented viewpoints regarding how a user's situation compares with others, not only financially but also in their advisor selection. No other system has been designed in such a way to provide such comparative insights into one's financial situation or regarding their advisors. In addition, no system is as flexible as this is in terms of being able to manipulate data quickly on demand, view just the output charts in split seconds and have the ability to restore the underlying base facts entered in the global inputs field. Further, no system has been able to capture all data from multiple reports, make sense of it, and then return an aggregated financial plan with one single comprehensive financial wellness score.

While the present teachings have been described above in terms of specific embodiments, it is to be understood that they are not limited to these disclosed embodiments. Many modifications and other embodiments will come to mind to those skilled in the art to which this pertains, and which are intended to be and are covered by both this disclosure and the appended claims. It is intended that the scope of the present teachings should be determined by proper interpretation and construction of the appended claims and their legal equivalents, as understood by those of skill in the art relying upon the disclosure in this specification and the attached drawings.

What is claimed is:

1. A direct-to-consumer financial analysis and advisor comparison system, comprising:
   a storage;
   a website in electronic communication with a server, the website receiving user information from a plurality of users, the user information including estate, insurance, tax, and investment information for each of the plurality of users, the user information stored in the storage;
   the server having:
      an interface including computer instructions executing on computer hardware, the interface only allowing the plurality of users access to the system when they have paid for a subscription to the system;
      a system aggregator including computer instructions executing on computer hardware configured to receive the user information and use the user information to automatically create a prioritized to-do list for each of the plurality of users in at least the area of estate planning and insurance, the prioritized to-do list representing tasks to be completed in at least the area of estate planning and insurance; and
      a comparer including computer instructions executing on computer hardware, the comparer receiving the user information for each of the plurality of users, the comparer using the user information to automatically generate comparisons, the comparisons including (i) fees charged by different investment advisors, and (ii) investment performances of the different investment advisors;
   the website displaying the prioritized to-do list in at least the area of estate planning and insurance, and the comparisons to each of the plurality of users after being allowed access to the system by the interface, and
   wherein at least one of the displayed comparisons includes a comparison of (i) the fees to be charged by different investment advisors, and (ii) the investment performances to be obtained by the different investment advisors, for one of the users based on the user information for the one user, thereby allowing the one user to compare likely outcomes using different investment advisors, and
   wherein the website comprises a spreadsheet interface having at least one formula;
   a first sheet of the spreadsheet interface allowing a user to paste in financial information;
   at least one second sheet providing financial reporting using the at least one formula and the financial information pasted into the first sheet;
   wherein the spreadsheet interface allows the user to change data on the at least one second sheet, the at least one formula automatically using the changed data to allow the user to immediately see updated financial reporting without refreshing the website, and
   wherein the system aggregator further includes computer instructions executing on the computer hardware that is configured to receive the user information and use the user information to automatically calculate a financial wellness score for each of the plurality of users, the financial wellness score being a single number and representing a comprehensive financial analysis, wherein the system aggregator further includes computer instructions executing on the computer hardware that is configured to automatically create additional prioritized to-do lists for each of the plurality of users in the areas of investing and debt, and cash flow and taxes, the additional prioritized to-do lists representing tasks to be completed in the areas of investing and debt, and cash flow and taxes, and wherein the website displays the financial wellness score, and the additional prioritized to-list for the areas of investing and debt, and cash flow and taxes, and wherein the financial wellness score is a score from 0 to 16, with 16 being the highest, and calculation of the financial wellness score includes a review of at least the following areas of information: (1) cash position relative to living needs; (2) insurance status of deposit accounts; (3) interest being received on cash; (4) utilization of tax deductions; (5) adequacy of long-term cash flow projections; (6) use of tax-deferred vehicles; (7) whether fees paid to managers exceed the return generated by such managers; (8) whether debt level is under 50% of assets; (9) property is covered by insurance; (10) life, health and disability coverage; and (11) whether a current estate plan results in less than 10% in estate taxes with at least 60% of assets passing in nonprobate form.

2. The system of claim 1, wherein the at least one second sheet comprises an insurance sheet, an investment sheet, and an investment advisor comparison sheet, each sheet using the financial information pasted into the first sheet.

3. The system of claim 1, wherein the changed data is only saved to the system when the user selects a save button.

4. The system of claim 1, wherein the financial information pasted into the first sheet is exported from a financial software product.

5. The system of claim 1, wherein the comparisons are generated for a selected demographic of the plurality of users.

6. The system of claim 5, wherein the demographic comprises net worth.

7. The system of claim 1, wherein the comparisons include insurance coverages or spending habits.

8. The system of claim 1, wherein at least some of the user information is received from one or more independent advisors.

9. The system of claim 1, wherein one of the plurality of users is an investment advisor that provides financial advice to another one of the plurality of users, the system automatically alerting the investment advisor about the financial wellness of the another one of the users to assist the investment advisor in advising the another one of the users.

10. The system of claim 1, wherein the financial wellness score for each of the plurality of users is weighted according to financial objectives provided by the plurality of users in response to questions.

11. The system of claim 1, further comprising ratings of investment advisors received from the plurality of users, the ratings aggregated and displayed on the web site;

wherein the comparisons are generated for a selected demographic of the plurality of users; and the financial wellness score for each of the plurality of users is weighted according to financial objectives provided by the plurality of users in response to questions.

* * * * *